US006103353A

United States Patent [19]

Gasper et al.

[11] Patent Number: 6,103,353

[45] Date of Patent: Aug. 15, 2000

[54] COPY RESTRICTIVE DOCUMENTS

[75] Inventors: John Gasper, Hilton; James Edward Sutton, Rochester, both of N.Y.

[73] Assignee: Eastman Kodak Company, Rochester, N.Y.

[21] Appl. No.: 09/111,984

[22] Filed: Jul. 8, 1998

[51] Int. Cl.[7] .......... B32B 3/00

[52] U.S. Cl. .......... 428/195; 283/72; 283/74; 283/93; 283/94; 283/107; 283/109; 380/54; 428/201; 428/203; 428/204; 428/206; 428/207

[58] Field of Search .......... 283/72, 74, 94, 283/107, 109, 93; 428/195, 194, 201, 203, 204, 206, 207, 411.1, 913; 430/9–11, 14, 523; 380/54; 503/227

[56] References Cited

U.S. PATENT DOCUMENTS

| | | | |
|---|---|---|---|
| 5,636,292 | 6/1997 | Rhoads | 382/232 |
| 5,710,834 | 1/1998 | Rhoads | 382/232 |
| 5,745,604 | 4/1998 | Rhoads | 382/232 |
| 5,748,763 | 5/1998 | Rhoads | 382/115 |
| 5,748,783 | 5/1998 | Rhoads | 382/232 |
| 5,768,426 | 6/1998 | Rhoads | 382/232 |
| 5,822,436 | 10/1998 | Rhoads | 380/54 |
| 5,832,119 | 11/1998 | Rhoads | 382/232 |
| 5,841,886 | 11/1998 | Rhoads | 382/115 |
| 5,841,978 | 11/1998 | Rhoads | 395/200.47 |
| 5,850,481 | 12/1998 | Rhoads | 382/232 |
| 5,919,730 | 7/1999 | Gasper et al. | 503/201 |

*Primary Examiner*—Bruce H. Hess
*Attorney, Agent, or Firm*—Mark G. Bocchetti

[57] ABSTRACT

A media for restricting the copying of a document utilizing one or more microdots that are embedded in said document for providing a non-visual, but machine detectable mark or marks. The detected means for detecting the presence of one or more microdots in said document inhibits a copy machine from copying the document.

4 Claims, 11 Drawing Sheets

SIGNATURE 1

SIGNATURE 2

SIGNATURE 3

SIGNATURE 4

FIG. 12
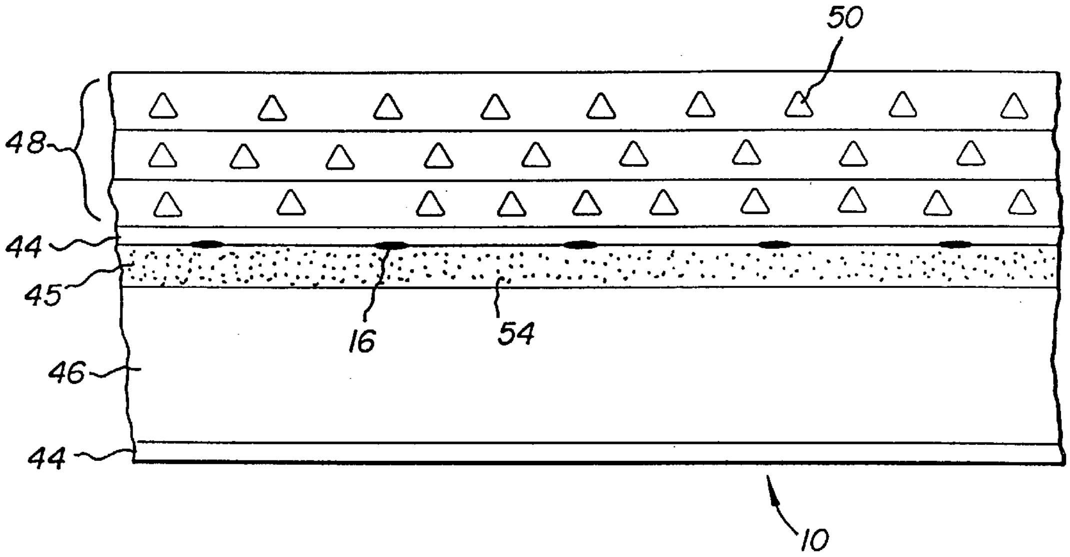
FIG. 13A
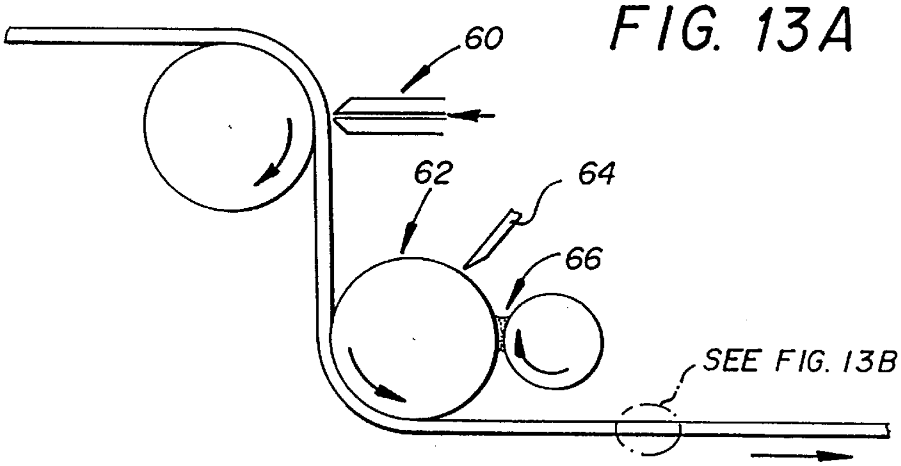
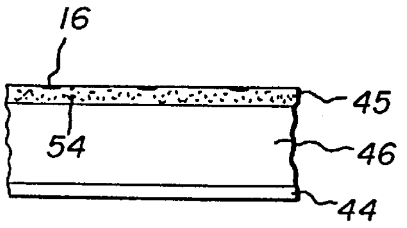
FIG. 13B

COPY RESTRICTIVE DOCUMENTS

CROSS-REFERENCE TO RELATED APPLICATIONS

The present application is related to U.S. application Ser. No. 60/004,404, filed Sep. 28, 1995, by Jay S. Schildkraut, et al., and entitled, "Copy Protection System"; U.S. Pat. No. 5,752,152 by John Gasper, et al., and entitled, "Copy Restrictive System"; U.S. Pat. No. 5,822,660 by Xin Wen, and entitled, "Copyright Protection In Color Thermal Prints." The last two applications were filed on even date with the present application.

MICROFICHE APPENDIX

The disclosure in the microfiche appendix of this patent document contains material to which a claim of copyright restriction is made. The copyright owner has no objection to the facsimile reproduction of any one of the patent documents or the patent disclosure as it appears in the U. S. Patent and Trademark Office patent file or records, but reserves all other rights whatsoever.

FIELD OF THE INVENTION

The invention relates generally to the field of copy restriction, and in particular to a technique for making copy restricted documents.

BACKGROUND OF THE INVENTION

Copying of documents has been performed since the first recording of information in document form. Documents are produced using many procedures on many types of substrates and incorporate many forms of information. Unauthorized copying of documents has also been occurring since the storage of information in document form first began. For much of the history of information documentation, the procedures used to copy original documents have been sufficiently cumbersome and costly to provide a significant impediment to unauthorized copying, thus limiting unauthorized copying to original documents of high value (e.g. currency, etc.). However, in more recent times the introduction of new technologies for generating reproductions of original documents (e.g. electrophotography, etc.) has decreased the cost and inconvenience of copying documents, thus increasing the need for an effective method of inhibiting unauthorized copying of a broader range of restricted documents. The inability of convenient, low cost copying technologies to copy original documents containing color or continuous tone pictorial information restricted unauthorized copying primarily to black-and-white documents containing textual information and line art. Recently, the introduction of cost effective document scanning and digital methods of signal processing and document reproduction have extended the ability to produce low cost copies of original documents to documents containing color and high quality pictorial information. It is now possible to produce essentially indistinguishable copies of any type of document quickly, conveniently, and cost effectively. Accordingly, the problem of unauthorized copying of original documents has been extended from simple black-and-white text to color documents, documents containing pictorial images, and photographic images. In particular, restricting the unauthorized duplication of photographic images produced by professional photographers on digital copying devices has recently become of great interest.

U.S. Pat. Nos. 5,193,853 and 5,018,767, disclose methods to restrict the unauthorized copying of original documents on devices utilizing opto-electronic scanning by incorporating spatially regular lines into the document. The spacings of the lineations incorporated in the original document are carefully selected to produce Moiré patterns of low spatial frequency in the reproduced document allowing it to be easily distinguished from the original and degrading the usefulness of the reproduction. Although the Moiré patterns produced in the reproduced document are readily apparent to an observer, the required line pattern incorporated in the original document to produce the Moiré pattern upon copying is also apparent to an observer. Additionally, production of the Moiré pattern in the reproduced document requires specific scanning pitches be employed by the copying device. Accordingly, this method of restricting unauthorized document copying is applicable only to documents such as currency or identification cards where the required line pattern can be incorporated without decreasing the usefulness of the document; application of this technique to high quality documents is unacceptable due to the degradation of quality and usefulness of the original document.

U.S. Pat. No. 5,444,779, discloses a method of restricting a document from unauthorized copying by the printing of a two-dimensional encoded symbol in the original document. Upon scanning of the original document in an initial step of a copying process, the encoded symbol is detected in the digital representation of the original document and the copying process is either inhibited or allowed following billing of associated royalty fees. U.S. patent application Ser. No. 60/004,404, filed Sep. 28, 1995, by Schildkraut et al., and entitled, "Copy Protection System," discloses the incorporation of a symbol of a defined shape and color into a document followed by detection of the symbol in a scanned representation of the document produced by the copying device. In both disclosures, the incorporated symbol is detectable by an observer and readily defeated by cropping the symbol from the original document prior to copying. In addition, incorporation of the symbol into the document is required in the generation of the original document leading to undesired inconvenience and additional cost. Accordingly, these methods of imparting restriction from unauthorized copying are unacceptable.

U.S. Pat. No. 5,390,003, U.S. Pat. No. 5,379,093, and U.S. Pat. No. 5,231,663 disclose methods of recognizing a copy restricted document by the scanning and analysis of some portion of the original document and comparison of the signal obtained with the signals stored in the copying device. When the signal of a copy restricted document is recognized, the copying process is inhibited. This method of restricting from the unauthorized copying of documents is limited in application because the signals of all documents to be copy restricted must be stored in or accessible by each copying device of interest. Because the number of potential documents to be restricted is extremely large and always increasing, it is impractical to maintain an updated signature database in the copying devices of interest.

Methods of encrypting a digital signal into a document produced by digital means have been disclosed. These methods introduce a signal which can be detected in a copying system utilizing document scanning and signal processing. These methods offer the advantage of not being detectable by an observer, thus maintaining the usefulness of high quality restricted documents. However, implementation of these methods is dependent on digital production of original documents. Although increasing, production of high quality documents using digital means is still limited. Accordingly, this approach is not useful for restricting the unauthorized copying of high quality documents produced using nondigital production methods.

Finally, U.S. Pat. No. 5,412,718 discloses the use of a key associated with the physical properties of the document substrate which is required to decode the encrypted document. This method of restricting the unauthorized copying of documents is unacceptable for applications of interest to the present invention because it requires encryption of the original document rendering it useless prior to decoding.

SUMMARY OF THE INVENTION

The present invention is directed to overcoming one or more of the problems set forth above. Briefly summarized, according to one aspect of the present invention, there is provided a copy restricted document comprising:

a support layer;

at least one image-forming layer coated on said support layer; and a pattern of microdots positioned between said support layer and said at least one image-forming layer.

The primary object of the present invention is to provide a document that is copy restricted without degrading the quality of the document.

Another object of the present invention is to provide a method of copy restriction that does not require the use of digital techniques.

Yet another object of the present invention is to provide a copy restricted document that incorporates a plurality of prescribed microdots in the document to be restricted that are not visible under normal viewing conditions.

A further object of the present invention is to provide currency that is copy restricted.

Still another object of the present invention is the encryption or encoding of signatures into the plurality of prescribed microdots for assigning document ownership.

Another object of the present invention is the printing of the back of photographic prints with microdots.

Another object of the present invention is coloring the edge of copy restricted media to enable visible and/or machine readable identification of the media.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The restricted documents of the present invention have several positive features. A microdot pattern incorporated into the document is not detectable by the user under routine conditions of document viewing allowing it to be used in high quality documents without any detectable degradation in the usefulness of the document. The microdot pattern can be employed throughout the document, thereby increasing the robustness of detection, while simultaneously making it impossible to crop out of the document. Additionally, because the microdot pattern is substantially invisible, authorized copying of the original document results in reproductions of high quality and utility. The inventive copy restrictive documents represent a low cost solution to manufacturers of copying devices incorporating opto-electronic scanning devices and digital signal processing since no new equipment is required. The ability to incorporate the microdot pattern into the document medium during medium manufacturing makes it simple and cost effective for the producer of the original document to implement. And finally, coloring the edge or edges of the document media enables visual and/or machine readable identification of the copy restrictive media.

BRIEF DESCRIPTION OF THE DRAWINGS

FIG. 12 is a cross-sectional representation of a light-sensitive photographic medium containing preprinted microdots on the image-bearing side of the support layer;

FIG. 13 is a diagram of a method of imbibing microdots into a reflective resin-coated support layer;

To facilitate understanding, identical reference numerals have been used, where possible, to designate identical elements that are common to the figures.

DETAILED DESCRIPTION OF THE INVENTION

Figure 1:
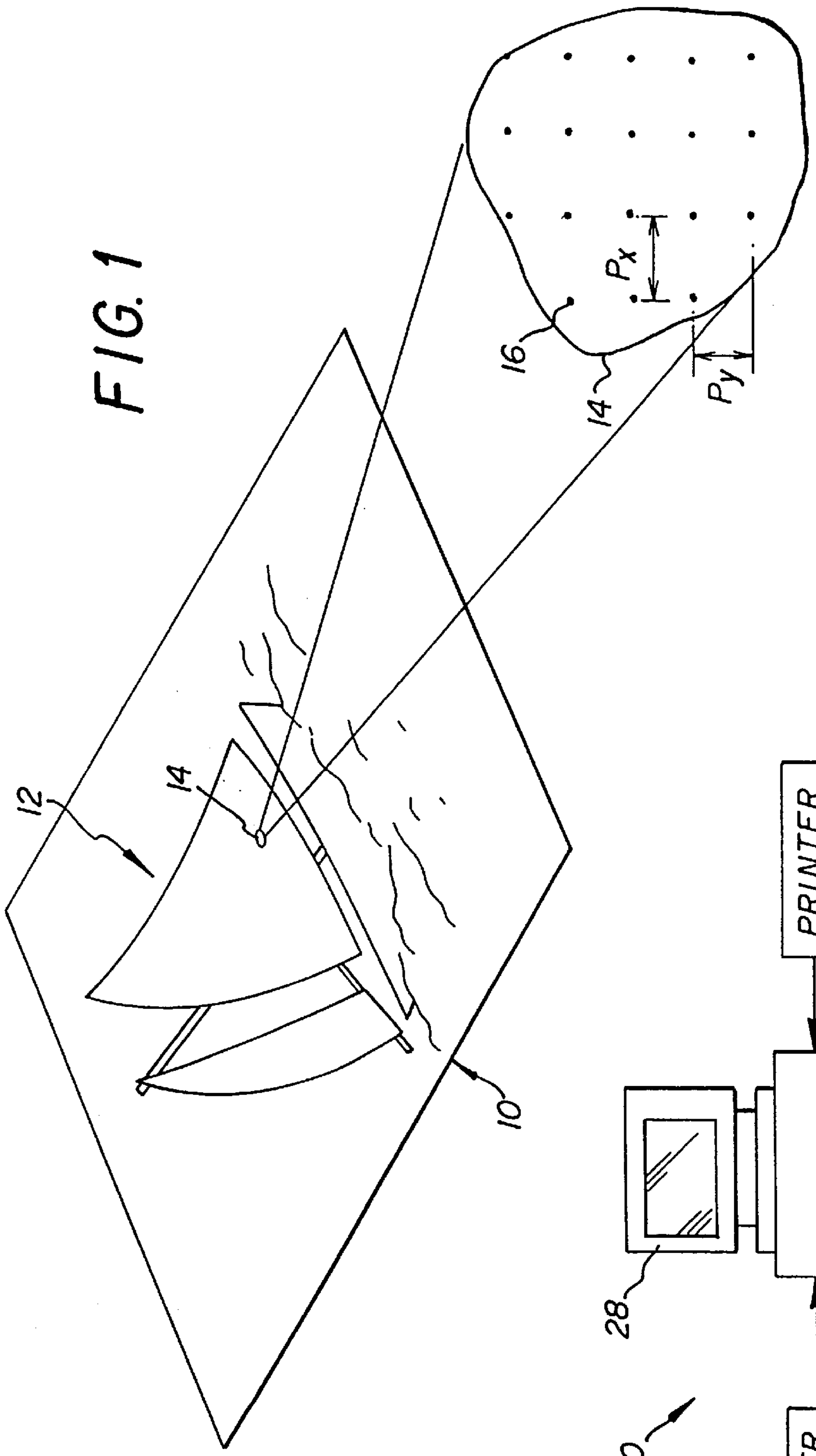
FIG. 1 is a perspective of a print incorporating the microdots of the present invention with an enlarged projection of a portion of the print to visually present the microdots.

Referring to FIG. 1, in its most general implementation, the inventive method to impart copyright restriction to hard copy information-bearing documents incorporates a pattern of microdots 16 into an image 12 on an original document 10. The pattern is enlarged for the reader's ease of viewing in window 14, but normally the pattern is not easily detectable by visual examination of the image 12.

Figure 2:
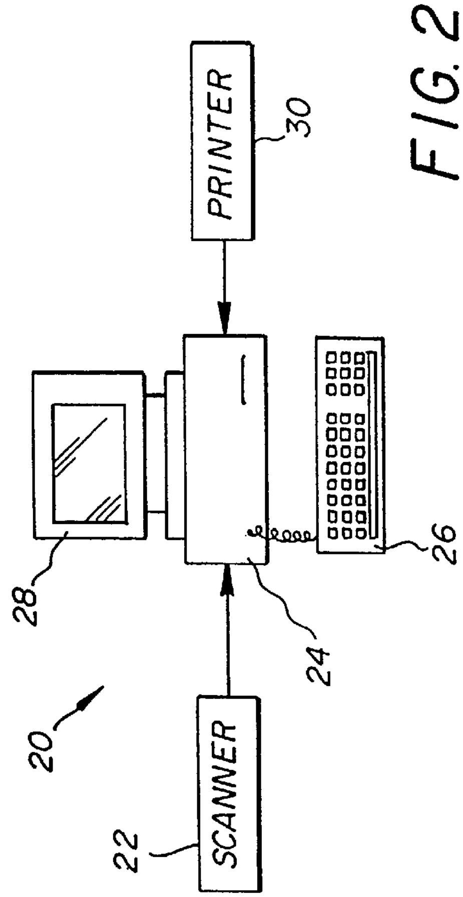
FIG. 2 illustrates in block diagram form a system on which the present method may be incorporated.

FIG. 2 illustrates the arrangement of a typical copy print station 20. In a classical copy situation the original document 10 of FIG. 1 is placed on the bed of a scanner 22 to provide a digitized sequence of scanner signals to a digital image processing unit 24 that incorporates a keyboard 26, touch screen and/or mouse, for operator interfacing and a monitor 28 for viewing the scanned image. A printer 30 is directly attached to the digital image processing unit 24 or is attached via a communication link. With either configuration the printer 30 forms hard copy prints. An algorithm or the like, residing in the digital image processing unit 24, detects the presence of the pattern of microdots 16 in the original document 10, and automatically deactivates the printer 30 to abort the document copying process thereby restricting the unauthorized copying of the original document 10.

For the purpose of this disclosure, "hard copy, information-bearing documents" (henceforth referred to as "documents") is meant to refer to any type of sheet media, bearing, or capable of bearing, any type of visible information. The "sheet media" may be any reflective medium (e.g. paper, opaque plastic, canvas, etc.), or alternatively may be any transparent or translucent medium (e.g. photographic film, etc.). In this disclosure, "information" is meant to refer to any form of information that is visible to the observer. Typical information is either pictorial or graphical in form including, but not limited to, text, sketches, graphs, computer graphics, pictorial images, paintings, and other forms of two-dimensional art. "Original" in this disclosure is meant to refer to the document that is scanned in an initial step of the copying process. "Copy" means a reproduction, likeness, duplication, imitation, semblance that may be magnified or demagnified, whole or part of, in the form of a print, display, digital image file, depiction, or representation. "Scanning" is meant to refer to any opto-electronic means for converting an "original" to corresponding electronic signals. "Copy restriction" means prevention of copying by mechanical, electrical, optical, or other means including the degradation of the usefulness of any copied image as well as controlled enabling of document reproduction with proper authorization.

In the preferred embodiment of the invention, the microdot pattern is incorporated throughout the document to be copy restricted. Microdot placement at all locations within the document insures that the pattern will exist in at least one important area of the document making it impossible to remove the pattern by physical cropping without significantly decreasing the usefulness of any copied document. In another preferred form of the invention the microdot pattern is incorporated into the document in a pre-selected location or locations not covering the entire document.

In the practice of this invention, the incorporated microdots can take any of a variety of forms as long as they satisfy the requirements of being substantially undetectable by casual observation under normal conditions of document use and do not decrease the usefulness of the original document. "Casual observation" is meant to refer to observation of the document under conditions relevant to the normal use of the document including the conditions of viewing and illumination. In particular, viewing distances will conform to those for typical utilization of the original document without the use of special image modifying devices (e.g. magnifying optics, colored filters, etc.), and illumination will conform to typical levels of illumination using illumination sources of typical color temperature. "Detection by casual observation" is taken to mean discrimination of the individual microdots of the incorporated microdot pattern or a perceived increase in the density, either neutral or colored, of the document.

The invention is implemented using microdots of any regular or irregular shape. In the case of non-circular microdots, the orientation of the microdots can be selected to lie along any angle between 0 and 360 degrees relative to the horizontal axis of the information bearing document as normally viewed. In one preferred embodiment of the invention, the microdots are square in shape. In another form of the invention, the microdots are circular in shape.

In practicing the invention the size of the microdots is chosen to be smaller than the maximum size at which individual microdots are perceived sufficiently to decrease the usefulness of the document when viewed under normal conditions of usage. The minimum size of individual microdots is chosen to be greater than or equal to the size at which the microdot pattern can be reasonably detected by document scanning devices. A useful measure of the size of the microdots is to specify the area of an individual microdot as the diameter of a microdot having a circular shape of equivalent area (henceforth referred to as the equivalent circular diameter, ECD). In situations where the edge of a microdot is not sharply defined, the edge is taken to be the isodensity profile at which the density is half the maximum density. In the preferred embodiment of the invention, microdots of an ECD of less than or equal to 300 microns are utilized. The ECD of the microdots preferably is greater than or equal to 10 microns, and most preferably is greater than or equal to 50 microns.

One embodiment of the invention incorporates the microdots in a periodic pattern, although it is contemplated that the invention can be practiced with microdots aperiodically dispersed in the document. Periodic patterns of microdots appear to be more useful and can take on any periodic spatial arrangement. One embodiment of the invention places the microdots in a rectangular array. A second embodiment of the invention places the microdots in a hexagonal array. The center-to-center spacing of the microdots, defined as the distance between the centroids of two adjacent microdots, is chosen to be any distance greater than or equal to the minimum distance at which an increase in document density occurs which is observed by casual observation to decrease the usefulness of the original document. In one form of the invention, the spacing of the microdots is greater than or equal to 1.0 mm. The robustness of microdot detection in the document representative digital signal increases with an increase in the number of microdots present in the document. Although it is possible to practice the invention with any microdot spacing that exceeds the minimum spacing for the detection of an unwanted increase in density, the preferred embodiment of the invention incorporates microdots with a spacing, similar to the minimum allowable spacing as described above. Another method of practicing the invention utilizes a microdot pattern in which the center-to-center spacing of the microdots is less than 10 mm.

Microdots useful in the practice of the invention can be of any brightness, hue, and saturation that does not lead to sufficient detection by casual observation which would reduce the usefulness of the original document. To minimize the detectability of individual microdots, it is preferable to select the hue of the microdots to be from the range of hues that are least readily resolvable by the human visual system. It is also preferable to select the hue of the microdots under conditions of maximum visual contrast to their surround. When incorporated into photographic prints with images typical of professional photographers, it has been found that the areas of most critical interest to the photographer for observing the presence of microdots are the highlight areas of low reflection density and most critically white areas. It is therefore the object of this invention to select the hue of the microdots from the range of hues that are least readily resolvable by the human visual system when viewed against a white or substantially white surround. The white background is also typical of documents containing text and graphics. It is understood that in any small area of the image that is colored, the apparent color of the microdots is modified by the additional absorption of the image so as to appear a different color. For example, a yellow microdot with an overlying or underlying magenta background will appear red under magnification. At the same time, the hue of the microdots useful in the practice of the invention must also be selected to conform to the sensitivities of the anticipated document scanning device to optimize detection of the microdot pattern in the document representative digital signals.

Figure 3:
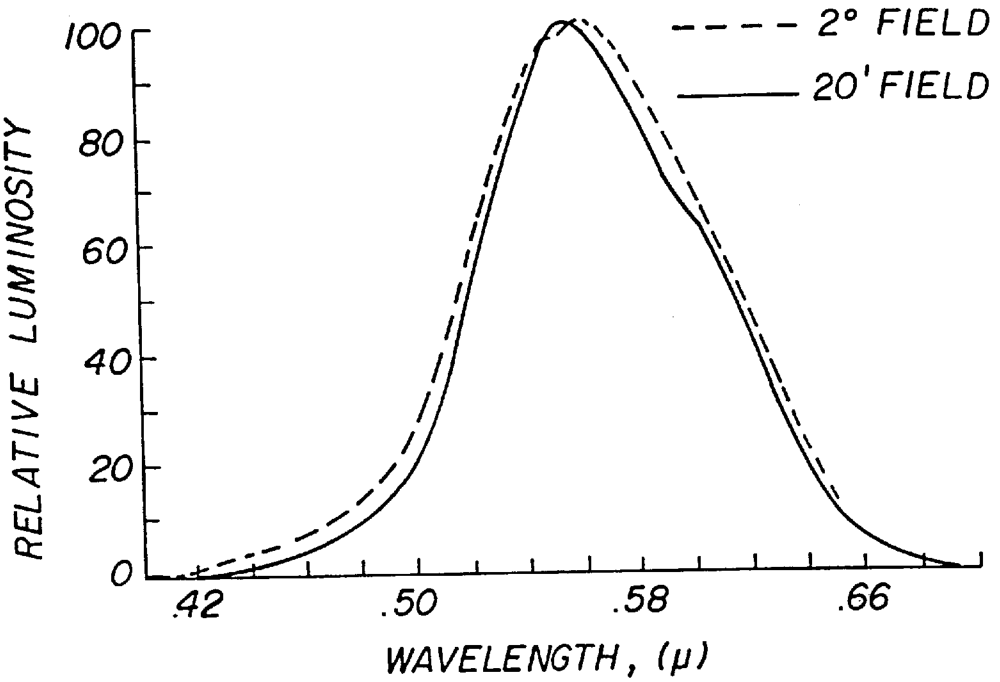
FIG. 3 is a graph illustrating the photopic luminosity functions of the human eye for two fields of centrally fixated viewing.
Figure 4:
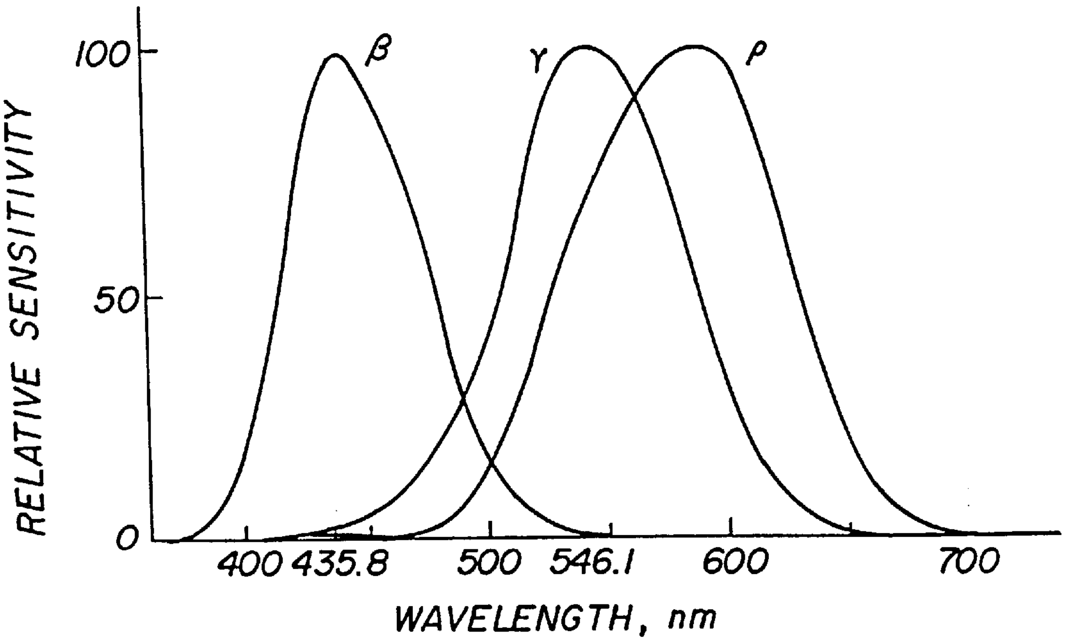
FIG. 4 is a graph illustrating trichromatic sensitivities.
Figure 5A:
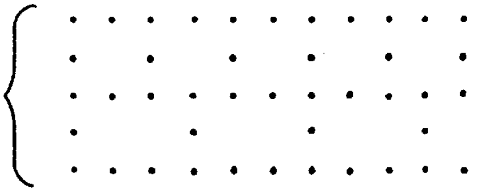
FIGS. 5A through 5D depict representative signatures encoded into arrays of microdots.
Figure 5B:
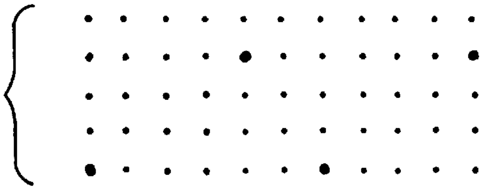
Figure 5C:
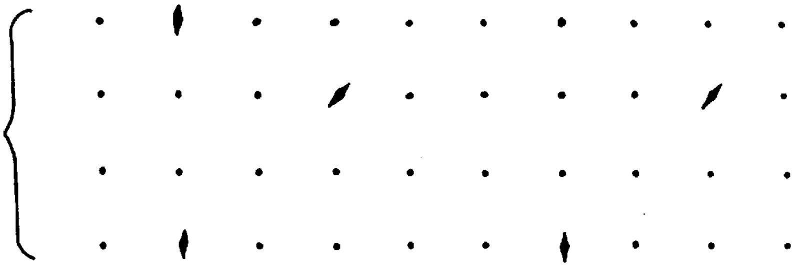
Figure 5D:
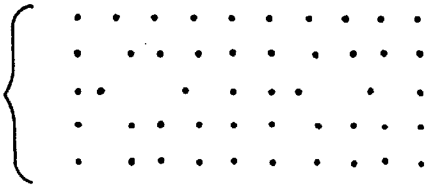

FIG. 3 shows the centrally fixated luminosity response for a typical observer for two different fields of view. The field of view for microdots of dimensions useful in the practice of this invention is approximately 0.02 degrees or 1.2 arc-minutes ("NATURE," p119, vol. 156, 1945.) It is specifically contemplated that the practice of this invention will be useful in the restriction of unauthorized copying of documents on copying devices designed to produce reproductions of the original document that are visually indistinguishable from the original as seen by an observer. The sensitivity of devices of this type are typically chosen to closely approximate the sensitivities of the human visual system as shown in FIG. 4. Accordingly, the most preferred embodiment of the invention will incorporate microdots that are substantially yellow in hue. Selection of yellow hues will simultaneously satisfy the requirements of being least sensitive to detection by an observer, but actually detectable by a copying device. The hue of the microdots is selected such that their spectral absorptions fall substantially in the wavelength region less than 500 nm. Alternatively, the hue of the microdots is chosen such that their spectral absorptions fall substantially in the wavelength region greater than 640 nm. Substantially, as used in this disclosure, is taken to mean that at least 75% of the integrated area under a plot of spectral absorption versus wavelength between the limits of 400 nm and 700 nm falls within the specified region. The spectral absorption of light by the yellow microdots is sufficient to allow detection by the document copier, but is insufficient to render the microdots perceptible. To accommodate systems in which the opto-electronic scanning device has spectral sensitivities which depart from the normal sensitivities of the human visual sensitivities, the hue of the microdots is preferably shifted in a similar manner.

Figure 6:
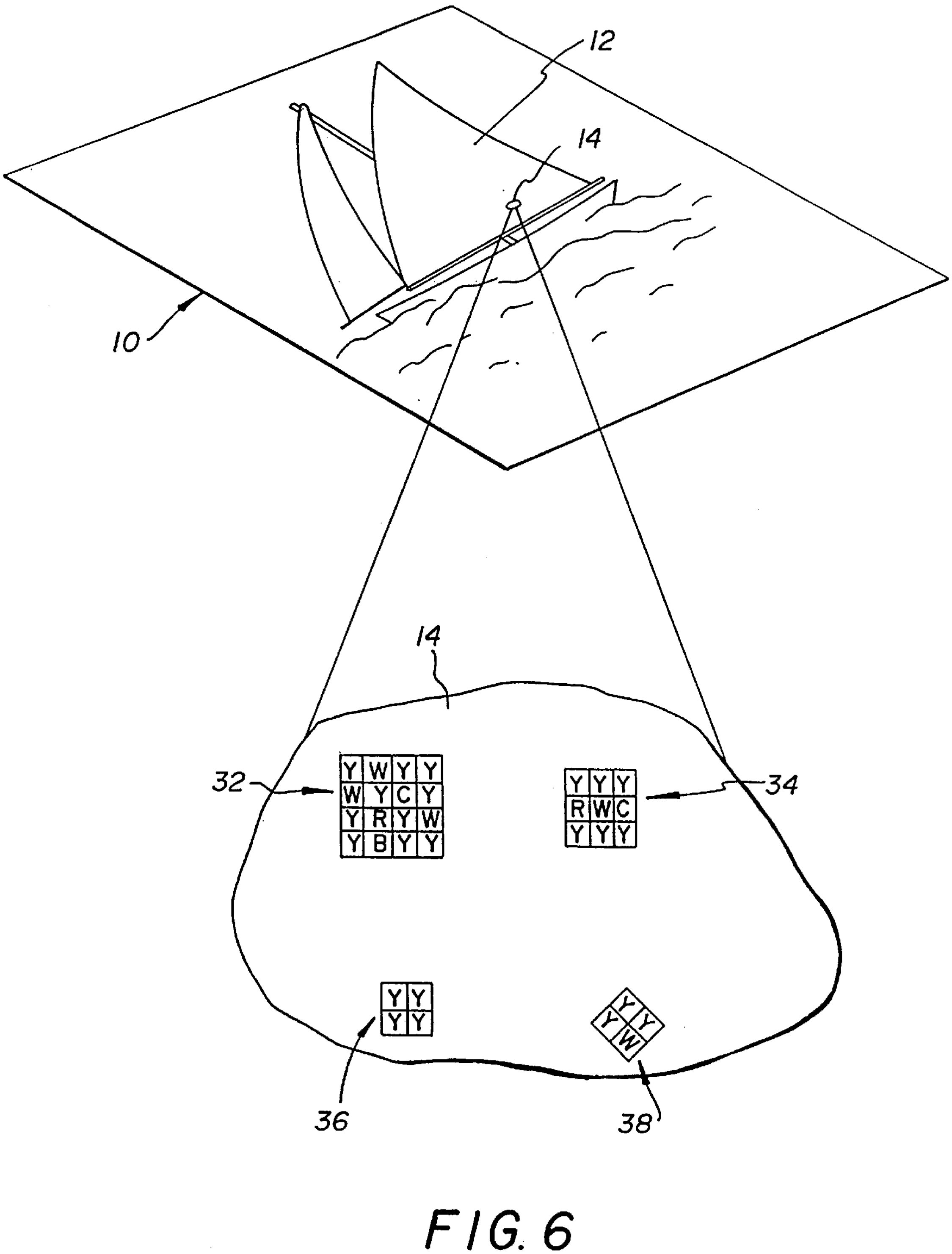
FIG. 6 depicts representative signatures encoded into the arrays composing the microdots (Y=yellow, M=magenta, C=cyan, R=red, B=blue, and W=white)

It is possible, and desirable, to practice the invention by incorporating microdots of different repetitive patterns as a means of providing a unique signature to a document. The term "signature" here is defined as any uniquely defined pattern that distinguishes or identifies one document from all others. Examples of four patterns constituting signatures are shown in FIGS. 5A through 5D. It is also contemplated that the invention may be usefully practiced by incorporating more than one microdot pattern in an original document. Patterns can differ in any of their physical characteristics such as microdot color (including less than 20% of the microdots of a color other than yellow), spectral absorptance, shape, profile, orientation, spacing, geometry of the microdot array, and microdot size. Additionally, individual microdots can be encoded with signatures contained within the microdots as shown in FIG. 6. Although the predominant color is yellow, the encoded microdots (32 through 38) have been subdivided into contiguous domains of different colors, such as magenta (M), cyan (C), red (R), green (G), blue (B), and white (W). Various configurations are shown at 32, 34, and 38. Yellow is the predominant color when occupying 50% or more of the area of each microdot. It is only necessary for other colors and white to occupy less than 50% and preferably less than 30% of the area so the color matrix of each microdot can be different from its neighbors and the microdots can also differ in color, spectral absorptance, shape, profile, orientation, spacing, geometry, and size to provide an almost unlimited number of unique signatures.

One embodiment of the invention incorporates the microdot pattern into the original document by producing the original document with a medium that contains the microdot pattern. In another embodiment, the microdot pattern is added to the produced original document prior to distribution. In yet another alternative embodiment, the microdot pattern can be incorporated into the document information prior to recording the document information and or image onto the medium.

Incorporation of the microdot pattern into the document medium prior to production of the original document can be accomplished using a number of printing technologies, such as gravure printing, lithographic printing, letterpress printing, inkjet printing, electrophotographic printing, laser printing, or thermal printing. Printing processes are preferably operated in a web configuration, but sheet fed printing is also contemplated. The medium of choice is passed through a printer which adds the microdot pattern utilizing one of the printing technologies described above. The original document is then produced on the medium containing the microdot pattern utilizing any applicable information recording technology resulting in an original document which can be restricted from unauthorized reproduction according to the teachings of this invention.

Figure 7:
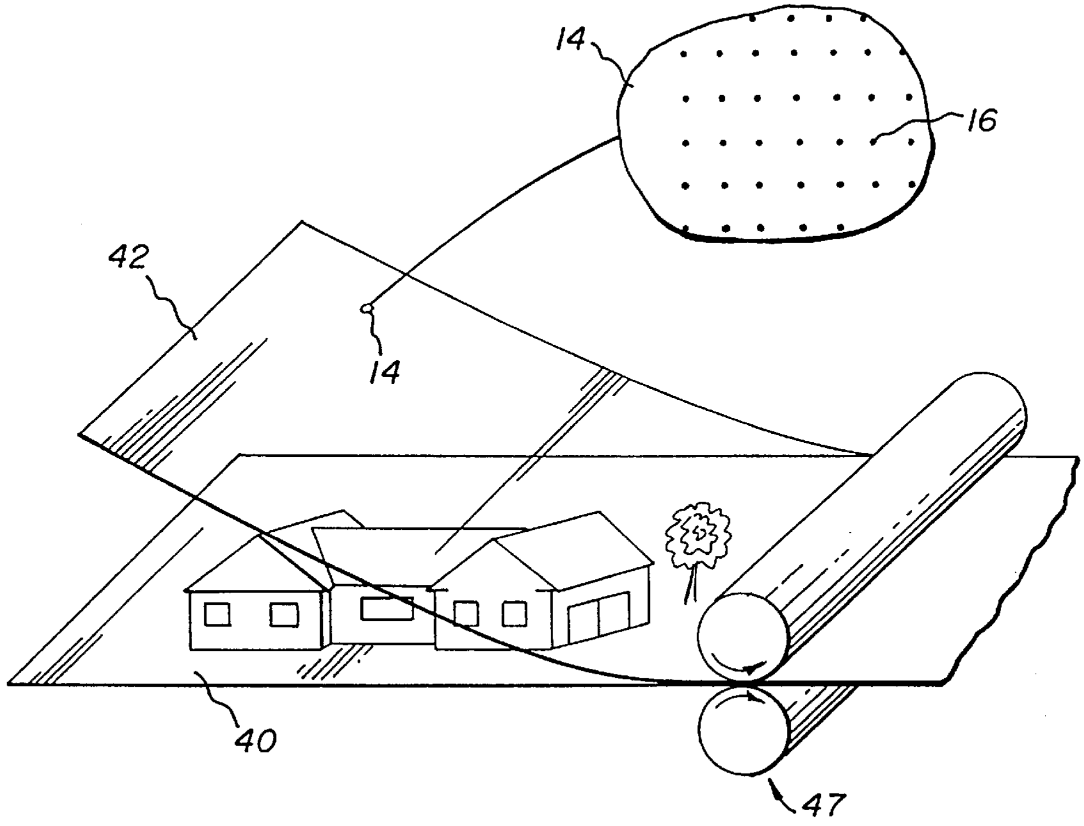
FIG. 7 illustrates the lamination of a microdot-containing transparent overlay to a photographic print.

In an alternative form of practicing the invention the microdot pattern is added to the original document following production of the original document. Any printing technology capable of printing onto the original document to be restricted as described above can be used in the practice of the invention to add the microdot pattern to the preformed document. One method useful for adding the microdot pattern to an image-bearing document is to laminate a transparent overlay to the document as shown in FIG. 7. The transparent overlay 42, incorporating the desired pattern of microdots 16, is laminated to an image-bearing document 40 utilizing pressure rollers 47. The technology of lamination is well-established and can employ heat and/or pressure-sensitive adhesives or radiation curable adhesives. The use of laminants containing patterns has been described in a copending patent application Serial Number to be assigned, entitled, "Copy Restrictive System," by John Gasper, et al., and filed on even date herewith.

Materials useful in forming the microdots include all colorants commonly referred to as dyes, solid particle dyes, dispersions, pigments, inks, toners, etc. These colorants may be transparent, translucent, or opaque and may modulate light by any means including absorption, reflection, refraction, scattering, or emission of light. When the invention is practiced using a medium which is observed by reflected light and the microdot pattern is incorporated prior to production of the original document, any of the colorants previously listed are useful. When the invention is practiced using a medium which is observed by transmitted light, the preferred forms of colorants include those which are substantially transparent. When the invention is practiced by adding the microdot pattern over the image-forming or image-bearing document, the preferred forms of the colorants include those which are substantially transparent.

It is specifically anticipated that the practice of the invention is particularly useful in restricting photographic images from unauthorized copying on copying devices utilizing opto-electronic scanning devices. As described above, the microdot pattern can be incorporated into the photographic medium prior to production of the photographic image, following production of the photographic image, or incorporated into a digital image prior to printing using a digital printing technology. In practicing the invention on photographic images, the microdot pattern is incorporated into the photographic medium prior to production of the photographic image, preferably during manufacturing. Reflective and transmissive photographic supports, substrates, or bases are contemplated in the practice of the invention. The microdot pattern is incorporated into a photographic medium by printing the microdot pattern onto the photographic support layer (base) using any of the printing technologies previously described prior to the coating of the light-sensitive materials.

It is specifically contemplated that both color and black-and-white image forming photographic media are useful in the practice of the invention. Accordingly, photographic media contemplated in the practice of the invention will contain at least one silver halide radiation-sensitive unit sensitive to at least one portion of the spectrum extending from the ultraviolet to the infrared. It is common to have silver halide radiation-sensitive units contain more than one silver halide containing layer sensitive to the same region of the spectrum. Color recording photographic media typically contain three silver halide light-sensitive units each recording light from one of the red, green, and blue regions of the spectrum. The silver halide light-sensitive layers may or may not contain color forming precursors. The order of the silver halide containing light-sensitive layers may take on any of the forms known to one skilled in the art of silver halide media design. Technologies relevant to the design and production of photographic media can be found in Research Disclosure Number 365, September 1994, herein incorporated by reference.

Figure 8:
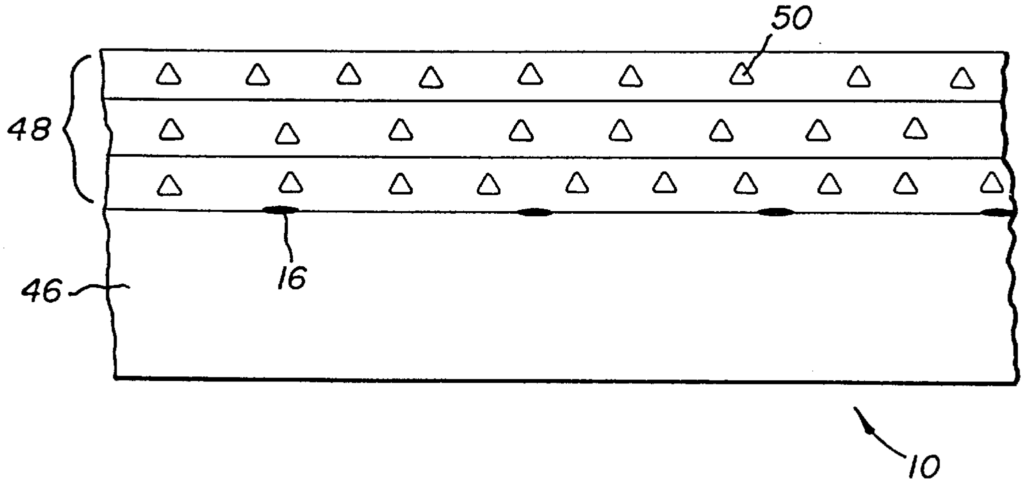
FIG. 8 is a cross-sectional representation of a light-sensitive photographic medium containing preprinted microdots on the image-bearing side of the support layer.

In FIG. 8 a radiation-sensitive medium, incorporating microdots 16 on a light reflective or transmissive support layer 46 is shown with microdots 16 printed on the image-bearing side of the support layer 46 prior to the addition of one or more light-sensitive image-forming layers 48, generally containing unexposed silver halide grains 50.

Figure 9:
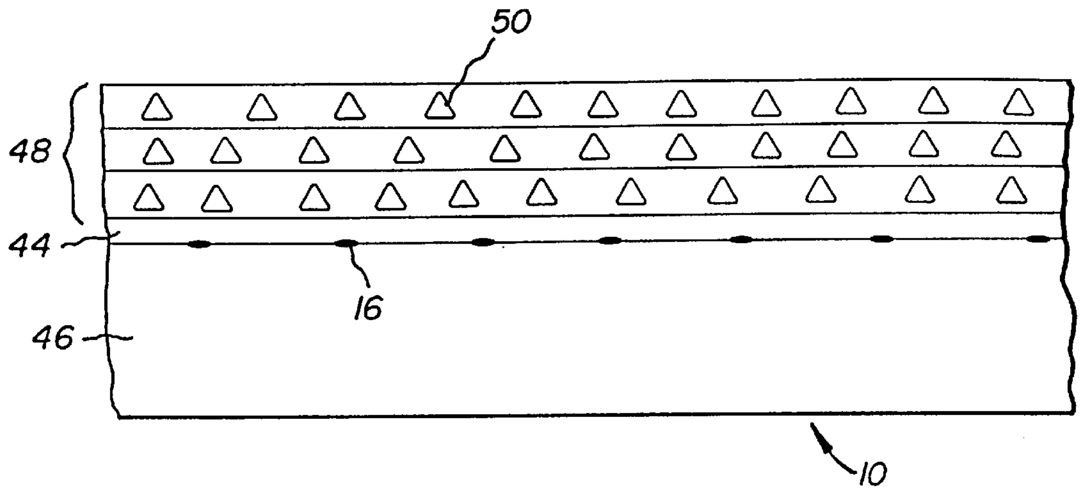
FIG. 9 is a cross-sectional representation of a light-sensitive photographic medium containing preprinted microdots on the image-bearing side of the support layer.

Referring to FIG. 9, the printed microdots 16 are protected from the light-sensitive image-forming layers 48 and subsequent photographic processing solutions by the application of a protective layer 44. It is common practice to form the thin protective layer 44 by applying a polymeric resin such as polyethylene.

Figure 10:
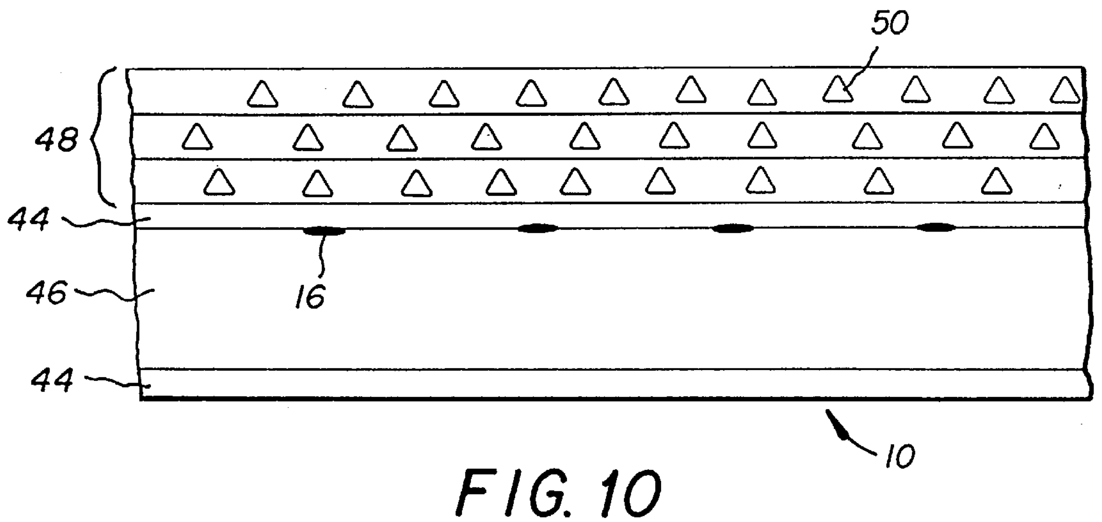
FIG. 10 is a cross-sectional representation of a light-sensitive photographic medium containing preprinted microdots on the image-bearing side of the support layer.

Next, FIG. 10 shows the protection of both surfaces of the light reflective or transmissive support layer 46 with a protective layer 44. The preferred technique is to print the microdot pattern onto the reflective support layer 46 prior to application of the protective layer 44.

Figure 11:
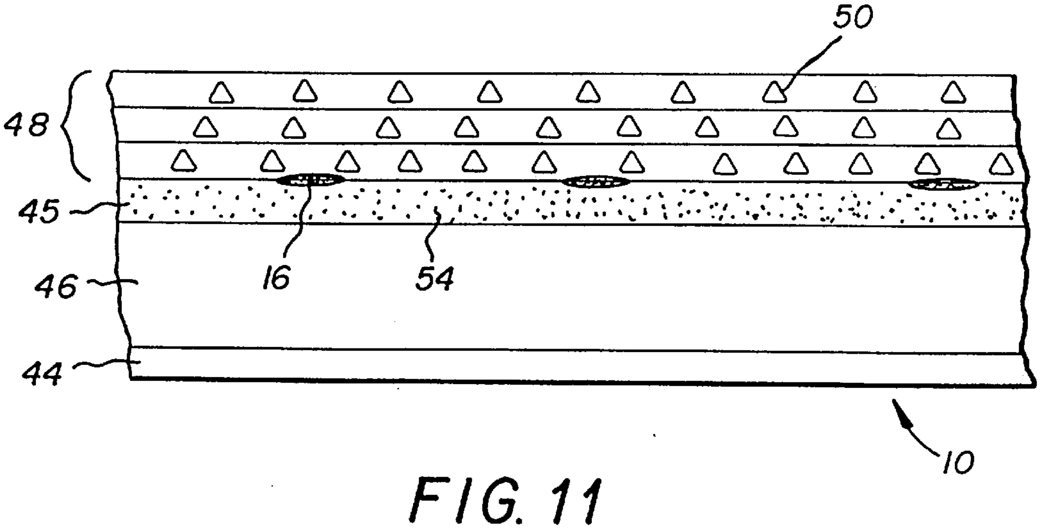
FIG. 11 is a cross-sectional representation of a light-sensitive photographic medium containing preprinted microdots on the image-bearing side of the support layer.

Referring to FIG. 11, in cases where a light-reflective layer 45 comprised of polymeric resin applied to the image-bearing side of the light reflective or transmissive support layer 46 contains light-scattering pigment 54 for altering the optical properties of the support layer 46 (e.g. titanium dioxide, barium sulfate, etc.). It is preferred to print the microdots 16 on top of the polymeric layer 45 after it has been applied to the support layer 46.

Another embodiment of the invention is shown in FIG. 12 incorporating a protective layer 44 between the printed microdots 16 and the light-sensitive image-forming layers 48.

Colorants useful in the practice of the invention include, but are not limited to, preformed photographic image dyes and filter dyes incorporated in photographic media as described in Research Disclosure Number 365, September 1994. Colorants are contemplated to be incorporated into any convenient binder or carrier useful in formulating printing inks or useful in formulating light-sensitive media. When there is no protective layer separating the printed microdots from the light-sensitive silver halide grain containing layers and subsequent access to photographic processing solutions, the preferred colorants are chosen from those which are not photographically active or subject to chemical destruction or modification by typical photographic processing solutions.

One method of preparing a light-reflective or transmissive support layer with microdots is to imbibe the colorant of the microdots into the light-reflective layer during the stage at which the hot polymer resin comprising the light-reflective layer is pressed against a chill roll for cooling. FIG. 13 shows this method. A hopper 60 supplies hot resin containing light-scattering pigment 54 to the support layer 46. The engraved chill roll 62 is supplied with yellow ink by reservoir 66. A wiper blade 64 removes excess colorant. The ink diffuses or imbibes into the light-reflective layer 45 during the cooling process to form yellow microdots 16.

Figure 14:
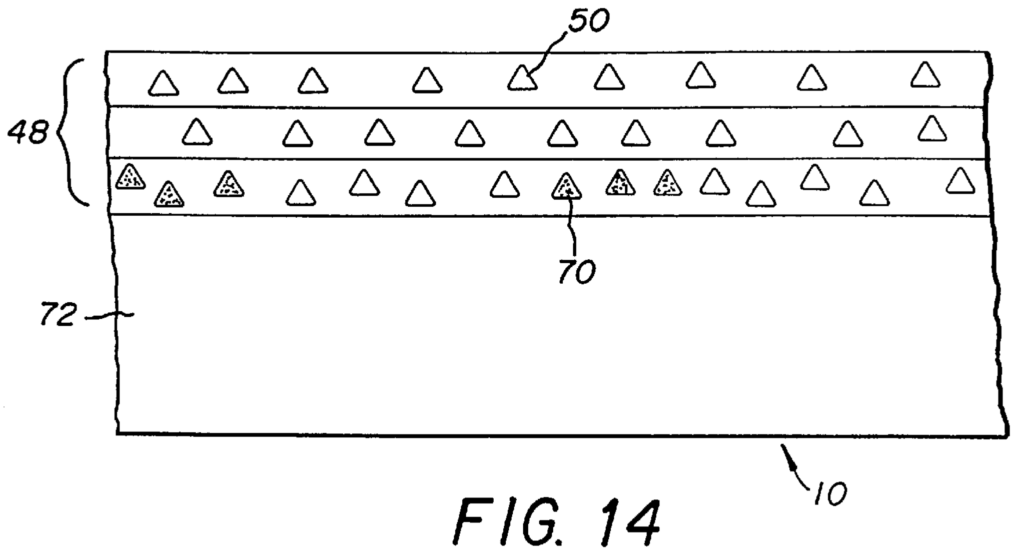
FIG. 14 is a cross-sectional representation of a light-sensitive photographic medium exposed to a microdot pattern.

In an alternative form of the invention, illustrated in FIG. 14, the microdot pattern is added to the photographic medium prior to or following photographic recording of the document image by exposure of the photographic medium to a spectrally, temporally, and spatially controlled exposure. The unexposed silver halide grains 50 in response to the aforementioned controlled microdot exposure, receive sufficient exposure to form a stable latent microdot image 70. The silver halide grains 50, sensitive to the microdot exposure, may be positioned anywhere in the light-sensitive image-forming layers 48 coated on a light reflective or transmissive support layer 72. Support layer 72 may be any of the composite light reflective or transmissive support layers shown previously in FIGS. 8–12.

One method of controlling the spatial distribution of the exposing radiation for the formation of a latent image of microdots is to employ contact printing masks. Microdot pattern masks useful in the practice of this form of the invention can be prepared using typical photographic methods. One such method photographs a black microdot pattern on a white background with high contrast lithographic film. The size and spacing of the microdot pattern to be photographed in combination with the magnification of the camera's optical system are chosen to give a photographic film image of the correct physical dimensions. A more preferred means of producing the microdot mask is to generate a digital image of the desired microdot pattern followed by the use of a digital graphic arts imagesetter to write the digital image onto lithographic film. The polarity of the digital image can be inverted in the digital image processing unit so that a single photographic writing and processing step results in the desired microdot mask.

Creation of the microdot pattern as a latent image in the photographic document can be usefully accomplished at any time following coating of the photosensitive materials onto the photographic substrate, prior to photographic processing of the photographic medium. Accordingly, it is contemplated that the microdot exposure, in one preferred form of the invention, would occur during manufacturing of the photographic medium. Exposure of the microdot pattern onto the photographic medium could occur prior to or following cutting of the photographic medium into its final form. It is also contemplated in another embodiment of the invention that the microdot pattern will be exposed onto the photographic medium immediately prior to or following exposure of the photographic medium to the photographic image to be recorded. Another embodiment of the invention exposes the microdot pattern onto the photographic medium immediately prior to photographic processing.

In another embodiment of the invention the microdot pattern is formed by selective exposure of the yellow image-forming layer of the photographic medium to the microdot pattern resulting in microdots of yellow hue after photographic processing. Selective exposure is accomplished by adjusting the photographic printing light source (e.g. by filtration) to include only wavelengths of light to which the yellow image-forming light-sensitive silver halide containing layers of the photographic medium are preferentially sensitive. The intensity of the microdot exposure is also adjusted such that appropriate density is formed in the yellow image-forming layer while minimizing the formation of density in the remaining image-forming layers.

Figure 15:
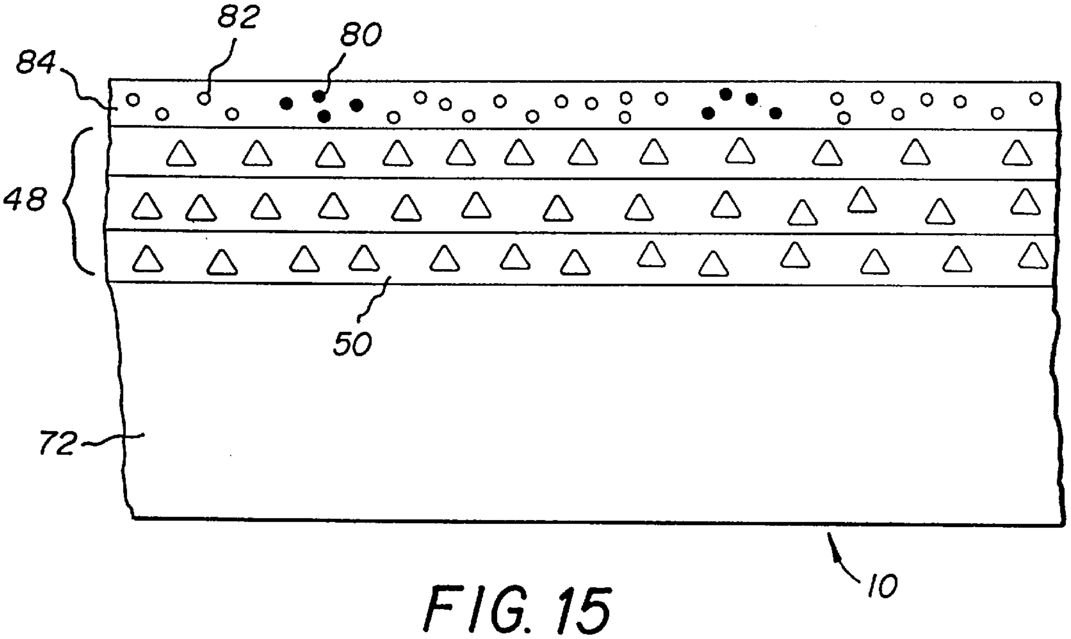
FIG. 15 is a cross-sectional representation of a light-sensitive photographic medium with a dedicated microdot-forming layer exposed to a microdot pattern.

Photographic formation of the microdot pattern can occur in one of the image-forming layers present in the photographic medium used for forming the photographic image as in FIG. 14. Alternatively, as shown in FIG. 15, the microdot pattern can be formed in a separate radiation-sensitive layer 84 specifically designed for formation of microdots. When a separate radiation-sensitive 84 is incorporated into the photographic medium, it can be located at any position between the image-bearing side of the support layer 72 and the front surface of the photographic medium. In one embodiment of the invention, the radiation-sensitive layer 84 is located farthest from the support layer 72. In another embodiment of the invention, the radiation-sensitive layer 84 is located closest to the support layer 72. In another embodiment of the invention the spectral sensitivity of a dedicated radiation-sensitive layer 84 does not significantly overlap the spectral sensitivities of the remaining image-forming silver halide containing light-sensitive image-forming layers 48. Spectral sensitization of the radiation-sensitive grains 82 of radiation-sensitive layer 84 to the infrared is contemplated. The light-sensitive grains 80 with response to the spectrally, temporally, and spatially controlled microdot exposure receive sufficient exposure to form a stable latent microdot image.

Methods of exposing the microdot pattern onto the photographic medium include contact or projection printers, scanning printers such as CRTs and laser printing devices, and arrays of illumination sources including laser and light-emitting diodes.

Figure 16:
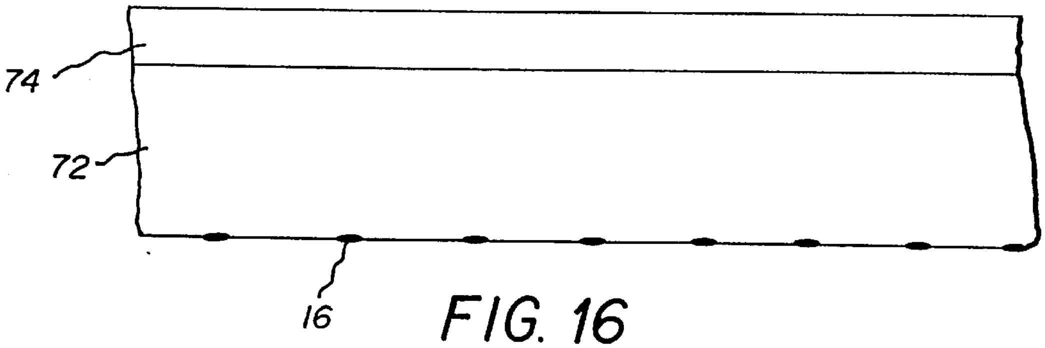
FIG. 16 is a cross-sectional representation of a light-sensitive photographic medium with a microdot pattern printed on the back side.

In yet another embodiment of the invention shown in FIG. 16, the light reflective or transmissive support layer 72 supporting on one side the image-forming layer 74 is printed on the opposite side with yellow microdots 16. The yellow microdots having a signature that provides important information about the manufacture of the product. This information is imprinted after the one or more light-sensitive emulsions of the image-forming layer 74 are coated and tested for photographic performance. This information can be provided in machine readable format or in human readable format when viewed with magnification and optionally with contrast enhancing filtration of the illuminant. A portion or all of the information may be encrypted. A particularly attractive method of printing this information is by inkjet printing, but other methods of printing are possible. In the aforementioned and following embodiments modifications can be made by, for example, replacing the image-forming layer 74 with an image-receiving layer and although the yellow microdot patterns in FIG. 16 appear only on the back of the support layer 72, there may be at least a second microdot pattern located between the image-forming or receiving layer(s) and the support or it may exist latently in the image-forming layer(s).

Two methods of rendering photographic media copy restricted have been described. One method provides a support layer that has on or in one surface of the support layer a pattern of printed yellow microdots. Light-sensitive layers are coated over the yellow microdots. These light-sensitive layers typically contain silver halide grains that scatter light and are spectrally sensitized to absorb light. The light-sensitive layers also typically contain absorber dyes that absorb an additional amount of light. This light scatter and absorption in the light-sensitive layers makes it very difficult or impossible to see the underlying printed yellow microdots with visual magnification prior to photographic processing. The second method provides for a controlled light exposure to produce a pattern of microdots in the form of stable latent-image centers in light-sensitive layers coated on the surface of a support layer with no microdots. In both methods the microdots are not visible even when the photographic media is examined with optical magnification prior to photographic processing. Only after photographic processing do the microdots become visible with magnification. This poses a problem to the user of the media because it is not possible to visually distinguish between this copy restrictive media and nonrestrictive photographic media when not associated with the original packaging of the media.

It is important to the user of photographic media who is creating the original copy restrictive document to be able to identify and distinguish the restrictive photographic media from non-restrictive media prior to photographic processing of the media. Copy restrictive photographic media may be backprinted with a visually apparent identification that requires no visual aid to read that the media is copyright restrictive. It is advantageous in some cases to not provide this backprinted message. When backprinting of this message is not provided another method of media identification is desired.

Figure 17A:
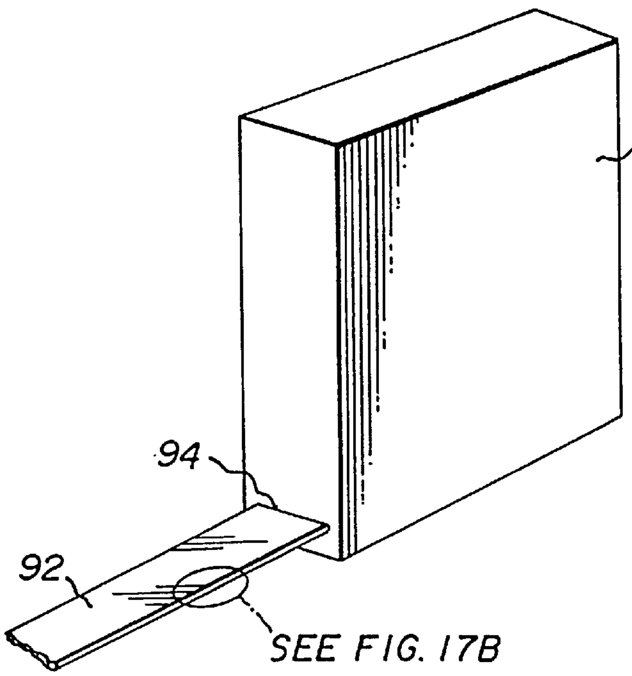
FIG. 17 is a perspective diagram of a light-tight canister containing a copy restrictive light-sensitive photographic medium colored along one or both edges.
Figure 17B:
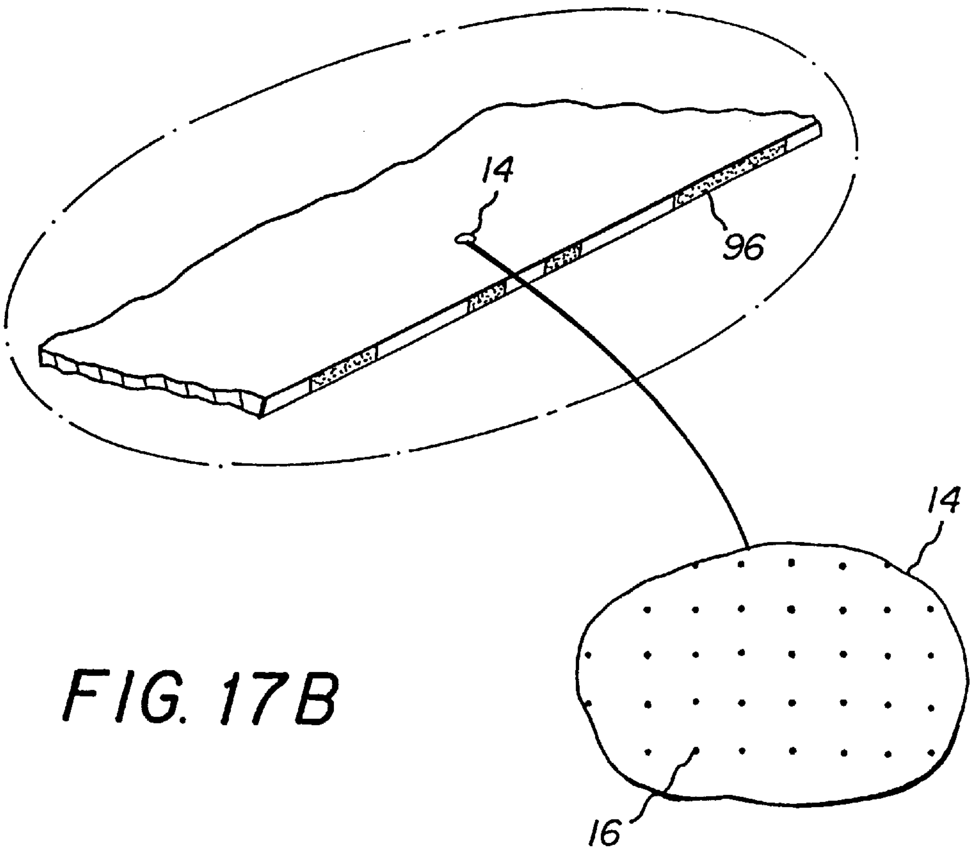

A preferred method of media identification is shown in FIG. 17. This method provides a colorant to one or both edges of the photographic media 92 when in roll form. A light-tight canister 90 may be used to hold the photographic media (as a media supply for automatic printers). A leader of the photographic media 92 projects from an exit slot 94 to enable grasping of the media for loading into the printer 30. The colored edges of this leader are visible for identification prior to media loading under roomlight illumination. The edge colorant 96 can be applied continuously or intermittently at the time of manufacturing to provide a unique binary signature. The color of the edge can be any color that is easily detectable by the unaided eye, especially bright fluorescent colors.

Figure 18:
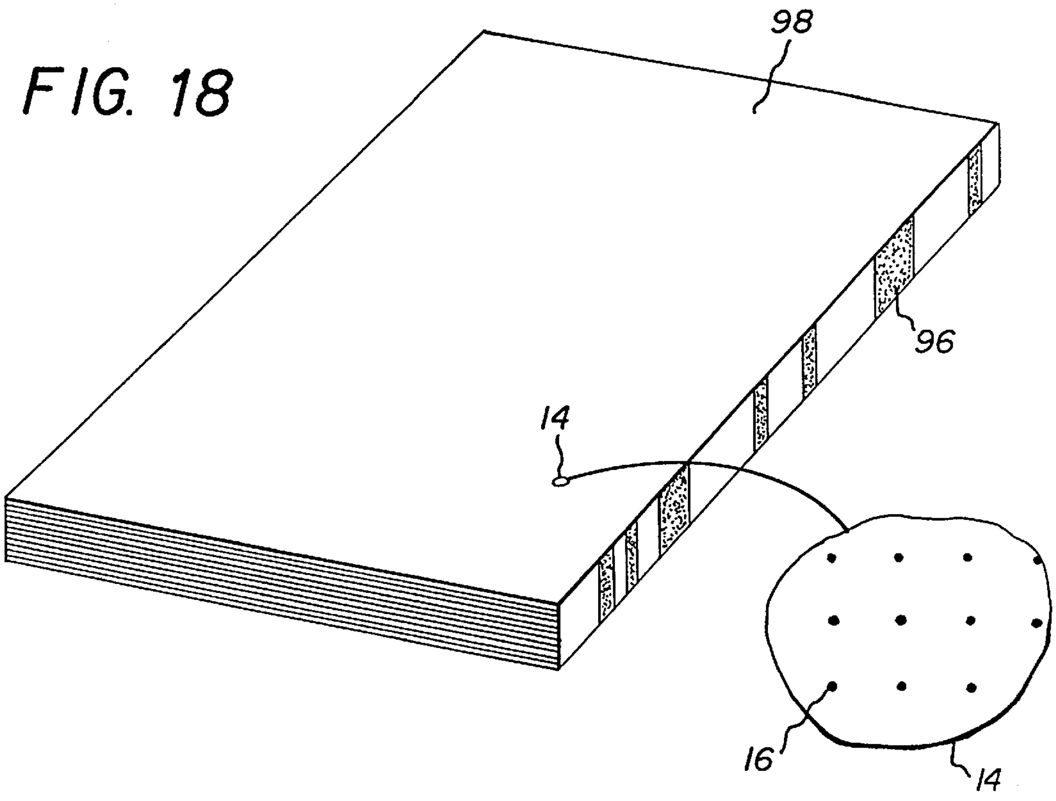
FIG. 18 a is perspective diagram of a stack of sheets containing copy restrictive light-sensitive photographic media identically colored along one or more edges.

When the copy restrictive photographic media is supplied in the form of a stack of sheets 98, as shown in FIG. 18, one or more edge colorants 96 may be continuously or intermittently applied to one or more edges to provide visual identification of the media 98. Only one sheet or part of one sheet needs to be removed from the container and be exposed to room light to enable identification. This is especially important because professional photographers use a variety of photographic media in their workplace and these media are not always contained in their original labeled packaging.

A further embodiment of the invention employs an edge coloration for identifying copy restricted photographic media that uses colorant that is removable. In another version of the invention, the edge coloration is removed during photographic processing of the media. This embodiment permits the professional photographer to easily and readily identify copy restrictive photographic media prior to use, but does not degrade the appearance or perceived quality of the finished product.

Figure 19:
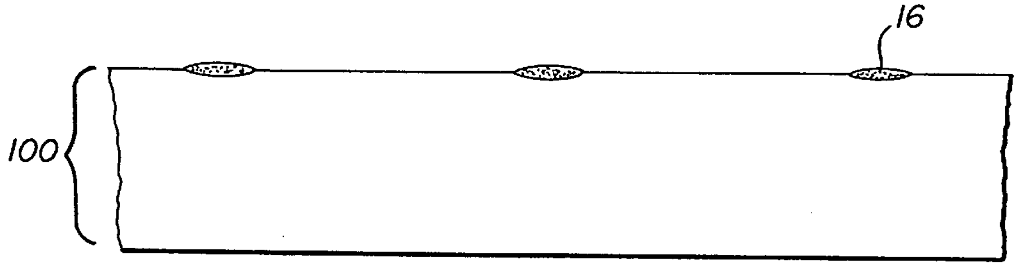
FIG. 19 is a cross-sectional representation of a support layer containing a pattern of microdots.

Nonphotographic media containing yellow microdots as shown in FIG. 19, can be employed to create information-bearing documents with the feature of copy restriction. The media 100 may be selected from the commonly available media for preparation of light reflective documents such as electrophotographic paper, inkjet paper, thermal paper, or paper used in the printing industry or the media may be light transmissive. This media may be printed with yellow microdots 16 by all forms of conventional printing such as gravure printing, lithographic printing, letterpress printing, inkjet printing, electrophotographic printing, laser printing, or impact printing prior to use in the preparation of copy restricted information-bearing documents by digital or non-digital copying or printing machines. The edges of the media can be printed with a visible colorant to identify the paper as featuring copy restriction as previously described.

In another version of the invention, thermal media such as used in the Eastman Kodak Company Colorease™ thermal printer is manufactured with yellow microdots preprinted into the media. Any form of digital image, file, or record can be printed onto this thermal media to create a copy-restricted document. The back of this thermal media can be printed to visibly identify the media as copy-restrictive or the media may have colored edges as previously described.

Figure 20:
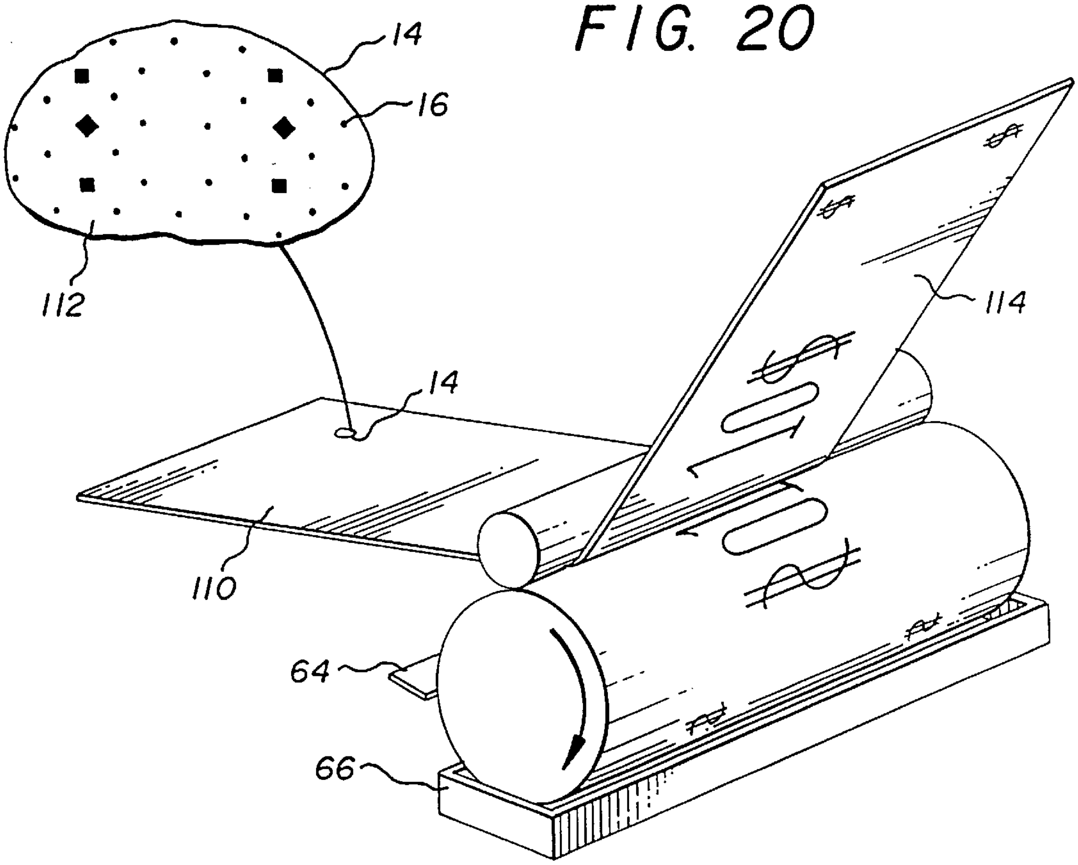
FIG. 20 is a perspective diagram representing the printing of currency with the paper containing yellow microdots.

Another embodiment of the invention (FIG. 20) employs copy restrictive media 110 containing yellow microdots 16 in one or both surfaces for the printing of paper currency 114. The figure shows printing of currency 114 of any denomination with a unique signature 112 shown in window 14 that can be detected by digital copiers. Detection of this unique signature 112 would stop the copying process without permitting any override feature built into the software.

For copy restrictive documents produced using digital means, a microdot pattern is incorporated into the digital representation of the document prior to production of the original document. In this implementation, picture elements (pixels) of the digital representation of the document, corresponding to the location of the desired microdot pattern, are adjusted in value to produce microdots having the desired density in the produced document. Application of this approach is specifically contemplated for color documents. In another form of the invention, the value of pixels corresponding to the microdot pattern are adjusted to produce a maximum amount of blue density (yellow dye formation) while the amounts of formed red and green density remain unchanged from the digital representation of the document.

The copy restrictive document, containing the microdot pattern, is scanned with an opto-electronic scanning device generally associated with the copy print station of FIG. 2. A copy restrictive document detecting system utilizes a scanner 22 and digital image processing unit 24 to detect the presence of the microdot pattern. The detecting unit controls the operation of a copying device or printer 30 which does not rely on opto-electronic scanning techniques to produce a reproduction of the original document. A digital copying system, incorporating an opto-electronic scanning device, utilizes a sub-sampled set of data obtained from the scanning of the copy restrictive document for the purpose of controlling document reproduction. A digital copying system utilizing an opto-electronic scanning device may be used to pre-scan the copy restrictive document for the purpose of previewing and detecting the presence of the microdot pattern. If a microdot pattern is not detected, a second scan of higher resolution is performed for the purpose of controlling document reproduction. The design of the opto-electronic scanning device is selected from any of the designs known to those skilled in the art of scanner design. A preferred scanning device utilizes a separate opto-electronic sensor and or illumination source conforming to the spectral properties of the microdot pattern.

The resolution of the opto-electronic scanning device used to detect the presence of the microdot pattern in the original document is chosen to distinguish the microdots from the surrounding document area. A preferred scanning resolution is equal to or greater than 75 dots per inch (dpi). A scanner of even higher resolution (1000 dpi or greater) is preferred for the detection and analysis of a repetitive signature in the document.

Scanning a document with the opto-electronic scanning device produces electronic signals corresponding to the pixel-by-pixel optical absorptance of the document. The electronic signals representative of the original document may be converted into a corresponding set of density representative electronic signals. The electronic signals, representative of the document, are preferably converted into a digital image prior to subsequent electronic processing to detect the presence of a microdot pattern in the document.

The presence of microdots can be ascertained by an examination of the digital image in a variety of ways. The number of microdots in the image may be counted by determining the number of regions of the digital image with code values and of a size and shape that are indicative of a microdot. Alternatively, the presence of the spatial pattern of the microdots, in the digital image, may be detected by means of image processing such as described in "DIGITAL IMAGE PROCESSING", 2nd Edition, William K. Pratt, Sun Microsystems, Inc., Mountain View, Calif., John Wiley and Sons (1991).

Prior to analysis of the digital representation of the original document for the purpose of detecting the presence of the microdot pattern, transformation of the digital signals into other metrics is preferred. One such transformation that is anticipated is to convert R, G, and B density representative signals into corresponding L* a* b* representative signals (see "The Reproduction of Color in Photography, Printing, and Television" by R. W. G. Hunt, Fountain Press, 1987). Other color space transformations are also anticipated as being useful in the practice of this invention.

Detection of microdots in the digital representation of the document is conducted throughout the entire image. In an alternative and preferred method of practicing the invention, the entire image can be segmented into sub-sections. The average color of each sub-section can be determined and those sections having average colors which favor the detection of microdots can be preferentially evaluated. Subsections which are substantially blue or of high lightness are recognized as being preferred for the detection of microdots.

The apparent color of a microdot in the image can be affected by the colors of the image surrounding the microdot and by the optical characteristics of the scanning device. To facilitate detection of microdots in the digital representation of the document, it is anticipated and preferred to adjust the color expectation when searching for a microdot based on the average color of the area of the document being evaluated. The color expectation for a microdot in any medium as seen by any opto-electronic scanning device can usually be determined empirically.

A Fourier transform of the section or sub-section of the digital representation of the original document is performed after determination of those pixels which represent microdots. The two-dimensional frequency spectrum obtained can then be evaluated at those frequencies anticipated for periodic patterns.

Direct optical detection of microdots can take the form of the measurement of the optical reflection or transmission of light by the document with a spatial resolution sufficient to resolve a microdot. Another method of direct optical detection of microdots is by the use of an optical correlator. Optical correlators are discussed in, "INTRODUCTION TO FOURIER OPTICS" by J. W Goodman, McGraw-Hill (1968).

The copying process is allowed to continue unimpeded if the presence of the microdot pattern is not detected in a document. If the microdot pattern indicative of a copy restrictive document is detected, a signal indicating the detection of a copy restrictive document is turned on and the copying process is halted by the controlling software of the copying device. After detection of the microdot pattern, the copying process may be re-initialized for the next document. Optionally, the copying system may be disabled until an authorized operator intervenes. The authorized operator may re-enable the copying process if authorization to copy is produced, or the copying device is re-initialized without producing a copy if no authorization is available.

EXAMPLES

Example 1

The first example is an implementation of the invention in photographic paper. The goal is to incorporate imperceptible microdots into an image on photographic paper and then to scan the image and detect the presence of the microdots by analyzing the digitized image.

The first step is to make a mask through which photographic paper may be exposed in order to place microdots in the paper. An imagesetter is set to a resolution of 635 dpi. An 8"×10" Eastman Kodak Kodalith™ film mask is made that consists of a rectangular periodic array of transparent square microdots of 80 micron width and height separated by about 1.68 mm. The area of the mask between the microdots is black.

Next, a colorpatch print is made as follows. An image that consisted of 512 color patches in color-negative film was printed to Eastman Kodak Professional Portra IIE™ color paper with a Berkey Omega D5500™ color enlarger with a Chromega D Dichroic II™ head. A Rodenstock™ enlarger lens of 105 mm focal length was used at a setting of f/16 and the exposure time was 7 seconds at high intensity. The dichroic settings were 69.5 yellow, 64.5 magenta, and 0.0 cyan. The negative was enlarged 2.57× when printed to a size of 8"×10". The paper was then contact exposed with blue light through the Eastman Kodak Kodalith™ mask. This was done on a second Berkey Omega D5500™ color enlarger used as a point light source. This enlarger had a 50 mm Rodagon™ lens set at f/8 with the dichroics set at maximum filtration of green and red light (0.0 yellow, 171 magenta, and 171 cyan). The distance from the open negative carrier to the paper plane was 86.4 cm. The emulsion of the Kodalith™ mask was held in a spring-loaded contact printing frame in contact to the emulsion of the paper at the easel of the enlarger. The exposure time was 7 seconds at low intensity. Finally, the paper was photographically processed using a Kreonite Color Paper Processor™.

The colorpatch print was scanned by an Epson™ flatbed scanner at a resolution of 200 dpi to create a digital image. The code values of the digital image are directly related to the reflectances of red, blue, and green light by the print. These code values are converted to the CIELAB color system so that each pixel has an L*, a*, and b* value.

For each microdot that lies within a patch in the colorpatch print we calculate the average background color as follows: Consider a pixel x that contains a microdot and a number of neighboring pixels as shown below;

| | | | | |
|---|---|---|---|---|
| + | + | + | + | + |
| + | + | o | + | + |
| + | o | x | o | + |
| + | + | o | + | + |
| + | + | + | + | + |

where o denotes a pixel that is influenced by the presence of a microdot, and + denotes a background pixel with a color that is not substantially influenced by the presence of the microdot. The background color (L*, a*, and b* values) assigned to the microdot containing pixel, is defined as the average color of the pixels denoted by the symbol +.

The color of a microdot as measured by the scanner is highly dependent on the color of the image that is coexistent with and surrounding the microdot. For this reason, using the colorpatch print we make a list of average background colors and the color of the pixel containing the microdot for each average background color. From this list we make a three-dimensional look-up table, 3D-LUT, that tells us what color we expect a microdot containing pixel to be for a wide range of background colors.

Careful measurement of the microdot spacing in the digital image of the colorpatch print reveals that the horizontal separation between microdots, Px, is 13.3521 pixels and the vertical separation, Py, is 13.2132 pixels. Refer to FIG. 1.

To demonstrate the detection of the microdots in a photographic print we printed a standardized portrait image recorded in color-negative film onto Eastman Kodak Professional Portra IIE™ color paper using the same enlarger as used for printing the color patch negative. The exposure time was 9.5 seconds at high intensity. The dichroic settings were 51.0 yellow, 47.5 magenta, and 0.0 cyan. The negative was enlarged 4.08× when printed to a size of 8"×10". The microdots were then exposed using the second enlarger as a point source of blue light with the same exposure conditions and Kodalith mask in the contact printing frame as previously described above. The exposed photographic paper was photographically processed using a Kreonite Color Paper Processor™. The yellow microdots were not visually apparent. The portrait print was scanned by an Epson™ scanner at a resolution of 200 dpi to obtain a digital image.

The digital image is divided into 256×256 pixel sections and the average blue code value is calculated for each section. The section with the largest average blue code value is selected for further processing. We will refer to this section of the digital portrait image as the "best section digital image".

The red, green, and blue code values of the best section digital image are converted into CIELAB values as described above. For each pixel in the best section digital image we calculate the average background L*, a*, and b* value as is also described above. (Note that this is done for all of the pixels in the image not just the ones that contain microdots. At this point, when the invention is practiced, we do not know which if any of the pixels in the image contain a microdot.) Using the 3D-LUT that was produced by an analysis of the colorpatch image and the average background color of each pixel we obtain the color that each pixel is expected to be if it contains a microdot.

Figure 21:
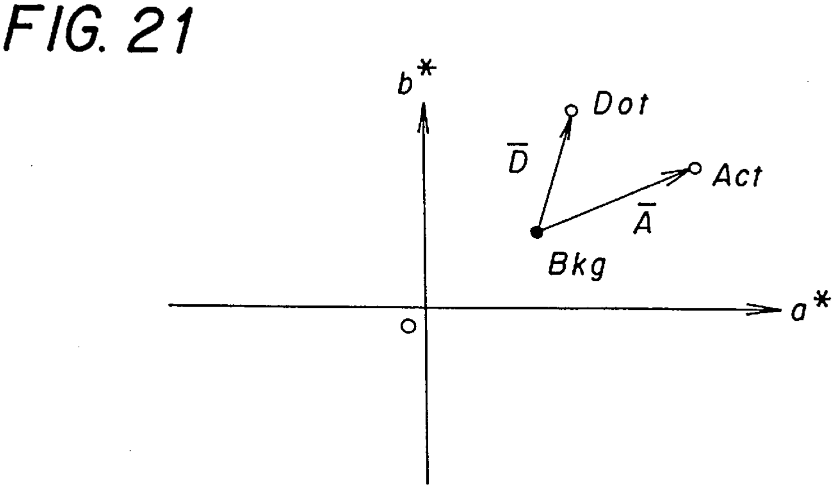
FIG. 21 is a vector plot useful in understanding the method of the invention.

We now define a quantity Y which is a measure of how close the color of a pixel is to the color expected for a pixel that contains a microdot. Referring to FIG. 21, a coordinate system is shown as a* values on the horizontal axis and b* values on the vertical axis. For any pixel we can define three points in this coordinate system. The average background color is located at coordinates $(a^*_{bkg}, b^*_{bkg})$, the expected color for the pixel if it were to contain a microdot is located at $(a^*_{dot}, b^*_{dot})$, and finally the actual color of the pixel is $(a^*_{act}, b^*_{act})$. We now define two vectors. The first vector D points from $(a^*_{bkg}, b^*_{bkg})$ to $(a^*_{dot}, b^*_{dot})$ The second vector A points from $(a^*_{bkg}, b^*_{bkg})$ to $(a^*_{act}, b^*_{act})$. The quantity Y is defined by the relationship, $$Y=2000A^*D/|D|^2$$

where the * symbol indicates a vector dot product and vertical lines indicate magnitude. This equation has the property that if the pixel has the color expected for a pixel that contains a microdot based on the average background color of the pixel (A=D) the dotness will equal 2000. This holds true regardless of what the average background color happens to be. On the other hand, if the color of the pixel is the same as the average background color (A=0) the Y value will equal zero. This again is true regardless of the average background color.

The best section digital image is converted to an image in which each pixel is assigned a Y value. Ideally, this image should have code values of around 2000 at pixels which contain microdots and code values close to zero elsewhere. We refer to this image as the "Y image".

The microdot image is the best section digital image processed so as to bring all microdot containing pixels to a uniform code value namely 2000. The next step is to determine if features are present in the microdot image at the known horizontal and vertical period of the microdot array Px, and Py, respectively. In order to do this we calculate the Fourier transform of the microdot image and from this calculate the power spectrum of the image. The power spectrum is obtained by squaring the magnitude of the pixel values (which are in general complex numbers) of the Fourier transform. The power spectrum is a measure of the amount of content in the dot image at any horizontal frequency fx and any vertical frequency fy. Both fx and fy may vary between −127 and 128.

The microdots will cause peaks in the power in the power spectrum. If the print is placed on the scanner so that there is an angle θ between the horizontal direction of the print and the horizontal direction of the scanner then the peaks in the power spectrum will be at discrete horizontal frequencies, $$fx'=\cos\theta n255/Px+\sin\theta m255/Py$$

and discrete vertical frequencies, $$fy'=\cos\theta m255/Py-\sin\theta n255/Px$$

where n and m are all negative and positive integers consistent with the constraint that fx' and fy' must be in the range −127 to 128.

We calculate the "total power" by adding up terms in the power spectrum for all fx and fy, except for the DC term, i.e., for fx=fy=0. We then calculate the "dot power" by adding up terms in the power spectrum (except for the DC term) over all frequencies fx' and fy' given by the above equation. We must do this for values of θ between 0 and 180 degrees. The measure M that we use to determine if microdots are present in the Y image is, $$M(\theta)=100\text{ Microdot Power}(\theta)/\text{Total Power}$$

If M is much larger than values typical of prints without microdots (not copy protected), for some value of θ, we conclude that the print is copy protected.

For the portrait print we calculate a maximum value of M of 35.8 at θ equal to 0 degrees. Another print was made and scanned in exactly the same way as the portrait print except that microdots were not added to the print (not copy protected or restricted). In this case the maximum value of M was 0.6 at a θ of 90 degrees. Finally, the portrait print with microdots was placed on the scanner at an angle. The horizontal direction of the print was not aligned with the horizontal direction of the scanner. In this case the maximum value of M was 32.8 at a θ of 11 degrees. We set a threshold of M at 10.0. If at some value of θ, the value of M is greater than 10, the print is not allowed to be copied; if M is less than 10, at all values of θ, we allow the print to be copied. We see from this example that the copy restrictive portrait print is not allowed to be copied. This is true regardless of how it is oriented when it is placed on the scanner. On the other hand, the non-copy restrictive print is allowed to be copied.

Example 2

The next example is an implementation of the invention in a digital image. First, a digital image of 512 uniform color patches was made. In the series of patches, the red, green, and blue channels take on all combinations of the code values 0, 37, 63, 92, 127, 169, 214, and 255. In the center of each color patch a 2×2 pixel wide microdot was placed by setting the blue code value of the pixels in the microdot equal to zero. This digital image was printed on an Eastman Kodak Company Colorease™ thermal printer at a resolution of 300 dpi.

The print of the color patches was scanned at a resolution of 200 dpi by an Epson™ flatbed scanner. As described in the previous example, we make a 3D-LUT that tells us what color we expect a microdot to be for a wide range of background colors.

Next, an aperiodic arrangement of 2×2 pixel microdots was incorporated into a digital test image. As before, a microdot is incorporated by setting the blue code value of pixels in the microdot equal to zero and leaving the red and green code values unchanged. This digital image was printed on an Eastman Kodak Company Colorease™ thermal printer at a resolution of 300 dpi. The yellow microdots were not perceptible. The print was then scanned at a resolution of 200 dpi by an Epson™ flatbed scanner.

The digital image of the scanned print containing an aperiodic arrangement of microdots was processed as described in Example 1 up to the point of creating the Y image. At this point, since in this example the microdot arrangement is aperiodic, it is not of use to calculate the power spectrum. Instead we threshold the Y image setting code values less than 1500 equal to zero and code values greater than or equal to 1500 equal to 255. This binary image has isolated 2×2 pixel or smaller regions of code value 255 separated by regions of code value zero. These isolated regions of code value 255 correspond to microdots in the print. From a count of these isolated regions we detect that the section of the digital image of the scanned print that was analyzed contained 142 microdots. Additionally, visual examination of the digital test image produced by the Eastman Kodak Colorease™ thermal printer was unable to detect the incorporated yellow microdots.

We consider the detection of one microdot as indicating that a print contains microdots and is therefore copy restrictive. The print of the test digital image has been shown to be copy restrictive by adding microdots to the digital image before it is printed. A print was also made of the test image without the microdots added (not copy protected or copy restricted). This print was scanned and processed in the same way as the microdot containing print. For this print, zero microdots were detected. Hence, the prints were correctly found not to be copy restrictive.

Example 3

A panel of 8 judges were asked to examine photographic prints that contained or did not contain yellow microdots. The judges were professional photographers and some were of notable fame in their profession. They were not compensated for performing the judging and were only told some of the prints contained a tagent that was being researched for copyright protection. The color-negative of Example 1, containing an image of a typical portrait scene, was used to create 8"×10" prints on Eastman Kodak Professional Portra IIE™ paper using exactly the same enlarger settings as in Example 1. Prints containing yellow microdots were also made by giving them a second post-exposure through a Kodalith™ mask in a contact printing frame using the second enlarger as a point source of blue light as before. A total of 5 Kodalith™ masks were made with an imagesetter as previously described. In addition to the previously mentioned mask containing transparent square microdots of 80 micron width separated by 1.6 mm, we also had four masks made with transparent square microdots of 60.80, and 100 micron width and center-to-center spacings of 2.4 and 3.2 mm as shown in the following chart:

| | Microdot Size (microns) | | |
|---|---|---|---|
| Spacing (mm) | 60 | 80 | 100 |
| 3.2 | | E | |
| 2.4 | B | C | D |
| 1.6 | | A | |

These masks were labeled A through E and the prints containing yellow microdots by exposure to these masks were given the same respective letter designation on the back of the prints. The print without microdots was labeled F on the back. The mask exposure time for the 60 micron microdots was 14 seconds, 7 seconds for the 80 micron microdots for all spacings, and 3.5 seconds for the 100 micron microdots.

The eight judges were individually asked to examine six groups containing three images in each group and to identify which print or prints were different. One or more in each set of three images contained a print with yellow microdots as a tagent. The photographers were provided with strong illumination from daylight fluorescent lamps and were free to manipulate the prints as they desired. None of the eight professional photographers found any difference between the three prints of each of the six groups and all photographers thought all prints were salable.

The photographic prints of a portrait to which dots were added with masks B, C, and D, were scanned with an Epson flatbed scanner at a resolution of 200 dpi. The digital image of each of the prints was processed as in Example 1. The maximum M value (see example 1) was 23.1 at an angle of 0.2 degrees for the mask B print, 30.3 at an angle of −0.1 degrees for the mask C print, and 28.7 at an angle of −0.6 degrees for the mask D print. Setting the threshold of M at 10.0 as in Example 1 we have detected that all three prints are copy restricted.

Example 4

A Zeta™ multi-pen graphics plotter was used to plot a hexagonal-packed array of yellow microdots on a piece of paper. The diameter of the microdots was about 0.2 mm, with a spacing to the nearest neighbor of 6.5 mm. The yellow ink from the pen soaked into the fibers of the paper. The paper was then inserted into the paper supply of a laser printer and text was printed onto the paper to produce a text document. The yellow microdots were not perceptible on the text document. A digital image of the text document was made using an Agfa Arcus Plus Scanner™. Examination of the blue channel of the digital image showed that the yellow microdots in areas free of toner are detectable.

Example 5

To a page of the tractor feed of the Zeta™ plotter was glued (Avery Glue Stic™) a paper currency with the front facing up. Yellow microdots were printed in a hexagonal-packed array on the currency by the plotter as described above. After removal from the plotter, the microdots were not visually apparent. A digital image of the currency was made using an Agfa Arcus Plus Scanner™. Examination of the blue channel of the digital image showed that the yellow microdots are detectable.

Example 6

To a page of the tractor feed of the Zeta™ plotter was glued an 8"×10" sheet of Kodak Professional Supra IIF™ photographic paper processed to minimum density (white) with the emulsion side facing the paper of the tractor feed so that yellow microdots could be plotted in a hexagonal-packed array onto the back resin-coated surface of the paper. The yellow microdots were about 0.22 mm in diameter with a spacing to the nearest neighbor of 6.5 mm. The microdots were not visible by casual observation and did not effect the white appearance of the front or backs of the print.

The invention has been described with reference to preferred embodiments. However, it will be appreciated that variations and modifications can be effected by a person of ordinary skill in the art without departing from the scope of the invention.

| PARTS LIST: | |
|---|---|
| 10 | original document |
| 12 | image |
| 14 | window |
| 16 | microdot |
| 20 | copy print station |
| 22 | scanner |
| 24 | digital image processing unit |
| 26 | keyboard |
| 28 | monitor |
| 30 | printer |
| 32 | encoded microdot |
| 34 | encoded microdot |
| 36 | encoded microdot |
| 38 | encoded microdot |
| 40 | image-bearing document |
| 42 | transparent overlay |
| 44 | protective layer |
| 45 | light-reflective layer |
| 46 | support layer |
| 47 | pressure rollers |
| 48 | light-sensitive image-forming layers |
| 50 | silver halide grains |
| 54 | light-scattering pigment |
| 60 | hopper |
| 62 | engraved chill roll |
| 64 | wiper blade |
| 66 | reservoir |
| 70 | exposed silver halide grains with latent image |
| 72 | support layer |
| 74 | image-forming layer |
| 80 | radiation-sensitive grains |
| 82 | unexposed silver halide grains |
| 84 | radiation-sensitive layer |
| 90 | light-tight canister |
| 92 | roll of photographic medium |
| 94 | exit slot |
| 96 | edge colorant |
| 98 | photographic sheet medium |
| 100 | media |
| 110 | media |

-continued

| PARTS LIST: | |
|---|---|
| 112 | unique signature |
| 114 | printed currency |

What is claimed is:

1. A copy restrictive medium comprising:

a transparent medium incorporating a pattern of visually undetectable microdots that are detectable by opto-electronic means which are capable of deactivating a printing device;

an image-bearing medium; and means for laminating said transparent medium to said image-bearing medium to form a copy restrictive medium.

2. The copy restrictive medium according to claim 1, wherein said pattern of microdots forms a unique signature.

3. A copy restrictive medium comprising:

a transparent medium incorporating a pattern of yellow microdots, wherein said microdots are visually undetectable, but can be detected by opto-electronic means which are capable of deactivating a printing device;

an image-bearing medium; and means for laminating said transparent medium to said image-bearing medium to form a copy restrictive medium.

4. The copy restrictive medium according to claim 3, wherein said pattern of yellow microdots forms a unique signature.

* * * * *